United States Patent [19]
Pan et al.

[11] Patent Number: 5,553,253
[45] Date of Patent: Sep. 3, 1996

[54] CORRELATION-BASED BRANCH PREDICTION IN DIGITAL COMPUTERS

[75] Inventors: Shien-Tai Pan; Kimming So, both of Austin, Tex.

[73] Assignee: International Business Machines Corporation, Armonk, N.Y.

[21] Appl. No.: 221,283

[22] Filed: Mar. 30, 1994

Related U.S. Application Data

[63] Continuation of Ser. No. 749,771, Aug. 26, 1991, abandoned.

[51] Int. Cl.$^6$ .................................................. G06F 9/32
[52] U.S. Cl. .................................. 395/375; 364/DIG. 1
[58] Field of Search .................................. 395/431, 375

[56] References Cited

U.S. PATENT DOCUMENTS

| | | |
|---|---|---|
| 4,370,711 | 1/1983 | Smith . |
| 4,430,706 | 2/1984 | Sand . |
| 4,435,756 | 3/1984 | Potash . |
| 4,470,711 | 9/1984 | Smith ..................................... 395/375 |
| 4,477,872 | 10/1984 | Losq et al. . |
| 4,679,141 | 7/1987 | Pomerene et al. ...................... 395/375 |
| 4,763,245 | 8/1988 | Emma et al. ............................ 395/375 |
| 4,764,861 | 8/1988 | Shibuya . |
| 4,833,599 | 5/1989 | Colwell et al. . |
| 4,853,840 | 8/1989 | Shibuya . |
| 4,943,908 | 7/1990 | Emma et al. ............................ 395/375 |
| 4,984,154 | 1/1991 | Hanatani et al. ....................... 395/375 |
| 4,991,080 | 2/1991 | Emma et al. . |

OTHER PUBLICATIONS

Predict Instruction Flow Based on Sequential Segments, Technical Disclosure Bulletin, vol. 33, No. 11, Apr. 1991, pp. 66–69.
Reducing The Branch Penalty In Pipelined Processors; *Computer* (USA), vol. 21, No. 7, pp. 47–55, Jul. 1988. (abstract only).
Predict Instruction Flow Based on Sequential Segments, Technical Disclosure Bulletin, vol. 33, No. 11, Apr. 1991, pp. 66–69.

*Primary Examiner*—William M. Treat
*Assistant Examiner*—Gautam Patel
*Attorney, Agent, or Firm*—Anthony V. England; Andrew J. Dillon

[57] ABSTRACT

Method and apparatus for predicting the outcome of branch instructions subject to execution in a multiple processor digital computer. Pipelining is a popular technique to accelerate the data processing rate of modern computers, and in particular the RISC architecture class of workstations. Accurate prediction of branch instructions is exceptionally important to the efficient use of pipelines, in that erroneous predictions require both the purge and reload of all affected processor pipelines. According to the present invention, branch prediction is based upon a correlation between a history of successive prior branches and a specified branch instruction. In a preferred practice, a branch prediction table is created. The fields in the table are derived and thereafter updated based upon the correlated combination of outcomes from prior branches and the branch address under consideration.

8 Claims, 4 Drawing Sheets

CORRELATION-BASED BRANCH PREDICTION IN DIGITAL COMPUTERS

This is a continuation of application Ser. No. 07/749,771 filed Aug. 26, 1991, now abandoned.

BACKGROUND OF THE INVENTION

The present invention relates to the field of processor design in digital computer systems. More specifically, the present invention relates to the prediction of directions for branch instructions executed by such a computer system.

The recent advances in reduced instruction set computing (RISC) architectures and VLSI technologies allow computer designers to exploit more instruction level parallelism by designing deeper pipelines and adding more functional Units for increasing the scalar performance of high speed processors. As more sophisticated hardware is built to exploit the available instruction level parallelism, more attention must be paid to the disruption of the pipeline caused by branches. Since branches constitute anywhere from 15% to 30% of all the executed instructions, the efficiency of handling branches is important. A significant improvement in processor performance can be achieved through the use of specially designed methods and hardware to reduce the cost incurred as a consequence of branching.

Many hardware implementations that reduce the cost of branches have been reported in the prior art. Among them, the branch target cache (BTC) is most commonly used. A BTC is a small cache memory used to keep information related to branches. Typical information kept in the BTC includes the address of a previously executed branch instruction, the target address for that branch, branch prediction bits, and sometimes, the instruction at the target address. The BTC may be organized as a direct-mapped, set-associative, or fully-associative cache. The organization of the BTC and the information kept in it are implementation dependent, but the general operation of the BTC is the same. During the instruction fetch stage, the instruction address is compared against the branch addresses in the BTC. If there is a match, then a branch is found and a prediction is made based on the stored prediction information associated with that branch. If the prediction is that the branch will be taken, the target instruction, if there is any in the BTC, will be dispatched and the target address will be used for the subsequent instruction fetches. When the branch is actually resolved, the branch information associated with that branch in the BTC is updated based upon the outcome of that branch.

Another hardware approach which has been implemented in a real machine is known as branch target prefetch. In this approach, only a short instruction buffer is used to temporarily hold the target instructions that have been prefetched. However, a mechanism for anticipating a branch in the upcoming instruction stream is required to initiate the target fetch in advance. If a branch instruction can be detected early and the target address can be calculated in advance, the target instruction can be prefetched with zero delay. In this kind of design, the branch prediction is implemented either in a dedicated table or in the instruction cache directory.

In both implementations the overall reduction of the branch cost for pipeline processing depends on the accuracy of the prediction. When a branch is mispredicted, incorrectly dispatched instructions must be flushed from the pipeline, causing extra delays in the pipeline. Given that the cost of pipeline flushing is high, a small increase in the accuracy of the prediction has a large impact on the pipeline performance.

A commonly used branch prediction scheme which is not overly complex yet reasonably effective is the N-bit counter based branch prediction technique. The basic idea for the N-bit counter based branch prediction is the use of an N-bit up/down counter for prediction. In the ideal case, an N-bit counter is assigned to each one of the unique branches (branches with different addresses). When a branch is about to be executed, the counter value C associated with that branch is used for prediction. If the value C is greater than or equal to a predetermined threshold value L, the branch is predicted to be taken, otherwise it is predicted to be not taken. A typical candidate for L is $2^{N-1}$. The counter value C for a branch is updated whenever that branch is resolved. If the branch is taken, C is incremented by one, otherwise it is decremented by one. If $C=2^{N-1}$, it remains at that value as long as the branch is taken. If C=0, it remains at zero as long as the branch is not taken. In actual implementations, a small cache memory is used as a table to store the N-bit counter value. Usually the lower order bits of the branch address are used to access the table, yielding the N-bit counter value C. These N-bits are used as the prediction bits for all branches whose addresses are mapped into the same memory entry. See U.S. Pat. No. 4,370,711 for additional background information.

Generally speaking, counter based branch prediction is a history based scheme, meaning that it determines the outcome of a branch based merely on the past history of that branch. The prediction information represented by the counter value for each branch is independent. Such a prediction scheme typically works relatively well for scientific workloads where programming structures are dominated by inner loops. In these applications the outcome of a branch tends to be more related to its own past history and less related to the outcomes of other branches. Such self-related history provides the predictability.

In many integer workloads where control transfers are intensive, the relation between branches is not as simple as that is in scientific workloads. The outcome of a branch for such applications usually is not only affected by its own past history but also is affected by the outcomes of other preceding branch operations. In other words, branches are usually correlated or interdependent upon one another. Because of this correlation or interdependence relation, the history of each individual branch looks chaotic, which in turn reduces the accuracy of any prediction scheme based merely on the history of that branch. Thus there exists the need for prediction apparatus and methods which increase accuracy of counter based branch prediction for workloads where branches are correlated.

SUMMARY OF THE INVENTION

In accordance with a preferred embodiment of the present invention, an M-bit shift register and a branch prediction table are used to predict the outcomes of branches. The M-bit shift register stores the last M outcomes of the executed conditional and unconditional branch instructions ("1" for taken and "0" for not taken) while the branch prediction table is used to store the prediction information. According to the present invention, multiple N-bit counters are associated with each entry of the table. Only one counter is used each time for prediction, and the selection of the counter is determined in part by the contents of the M-bit shift register. The prediction and the counter update are performed based on the N-bit counter prediction algorithm. For example, the counter can be a simple linear accumulator or based upon a complex mathematical function. In the preferred form there are $2^M$ sets of N-bit fields in each table entry (row), with each set of N bits representing the contents of an N-bit counter. The table entry is addressed through the use of some low order bits of a conditional branch address, obtained from either modulo operation or a hashing algorithm.

The significance of the invention as presently embodied in lies the use of an M-bit shift register to track and selectively relate correlated branch information. Thereby, the past history of a branch is divided into subhistories according to the bit-pattern stored in the M-bit shift register. The prediction is based on the information associated with the subhistory selected by the M-bit shift register.

DESCRIPTION OF THE PREFERRED EMBODIMENT

The correlation based branch prediction methods and apparatus to which the present invention pertains are preferably utilized in the context of a superscalar reduced instruction set computing (RISC) workstation of the type represented by the RISC System/6000™ manufactured and distributed by the IBM Corporation. The use of a pipeline architecture to process RISC instructions accentuates the importance of timely and correct branch prediction. Accordingly, the invention will be described in the context of the aforementioned RISC workstation.

Figure 1:
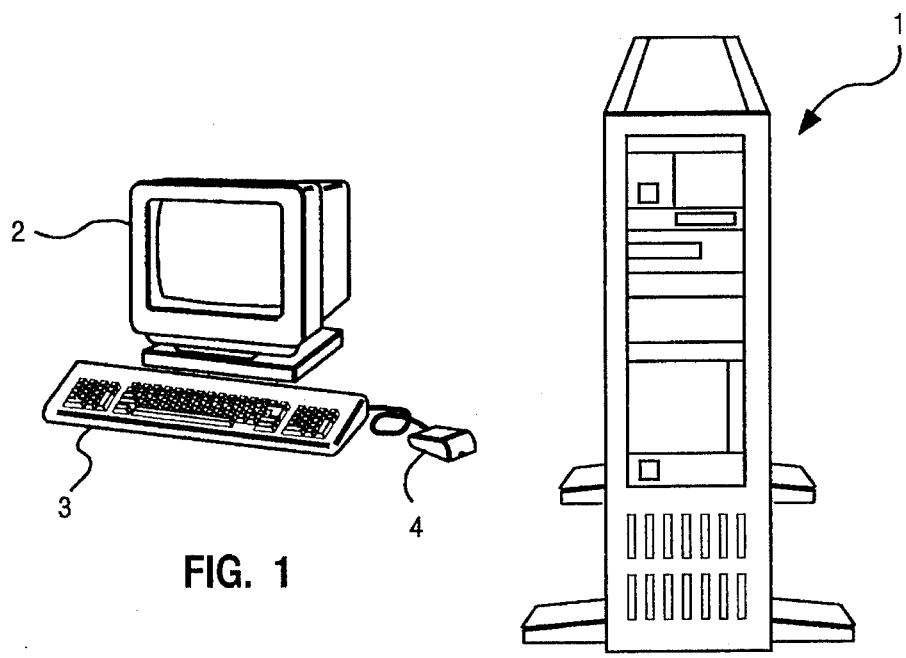
FIG. 1 is a schematic diagram of a RISC computer.

The representative RISC workstation includes as depicted in FIG. 1, a cabinet, generally at 1, which houses multiple processors, volatile memory, nonvolatile memory, communication circuitry, graphics circuitry, and input/output circuitry. The graphics circuitry routinely drives a color display, such as, item 2 in FIG. 1, while the input/output circuitry allows the human user to convey commands into the workstation using keyboard 3 or mouse 4. As is well known, the workstation in FIG. 1 can be a stand-alone unit or can be configured to operate in the context of a localized or extended network.

Figure 2:
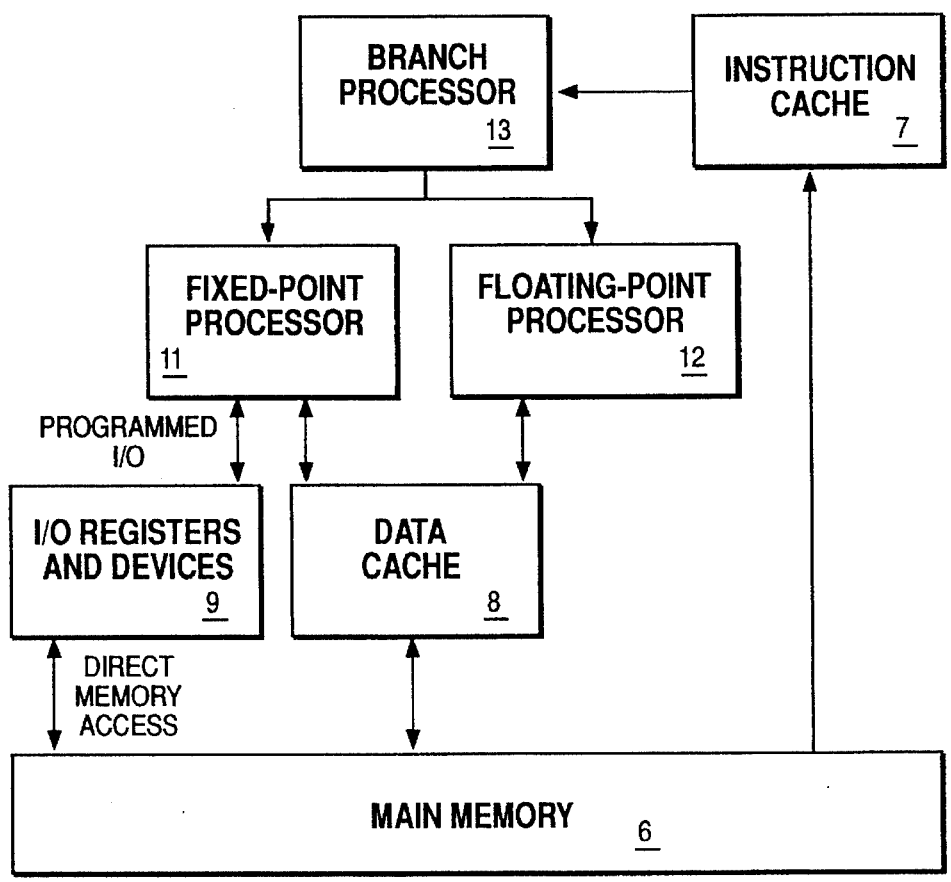
FIG. 2 is a schematic block diagram of the architecture within a superscalar RISC computer.

A representative architecture for interconnecting the processors in the workstation of FIG. 1 is depicted schematically by block diagram in FIG. 2. The elements shown include a main memory at 6, an instruction cache memory at 7, a data cache memory at 8, I/O registers and devices at 9, a fixed point processor at 11, and a floating point processor at 12. The present invention is directed to refinements in the architecture of branch processor 13.

Given that fixed point processor 11 and floating point processor 12 operate in pipeline fashion to maximize concurrent operations, it is particularly important that branch processor 13 anticipate branches to maximize the functional use of processors 11 and 12. In this respect, it is particularly undesirable to encounter a branch which requires that the data in the pipeline of either processor 11 or 12 be purged as a consequence of an erroneous prediction. Correlation based branch prediction according to the present invention increases the likelihood that branch processor 13 will correctly anticipate the outcome of a branch condition occasioned by processor 11 or 12 data manipulations.

In general, the benefits of branch prediction are well appreciated within the computer architecture design community. For example, the dynamic counter based branch prediction technique described hereinbefore is used in the IBM 370 mainframe computer.

In contrast to existing branch prediction architectures and methods of practice, which predict the outcomes of conditional branches based upon their own history, the present invention recognizes and implements refinements which are uniquely derived from the knowledge that multiple successive branch operations are often correlated or interdependent. The acquisition and use of such correlation information becomes relevant when attempting to improve the predicted outcome of branch instructions. Thus, the architecture and method of the present invention selectively combine information to improve the prediction of branch outcomes using multiple successive branching context history information.

Figure 3:
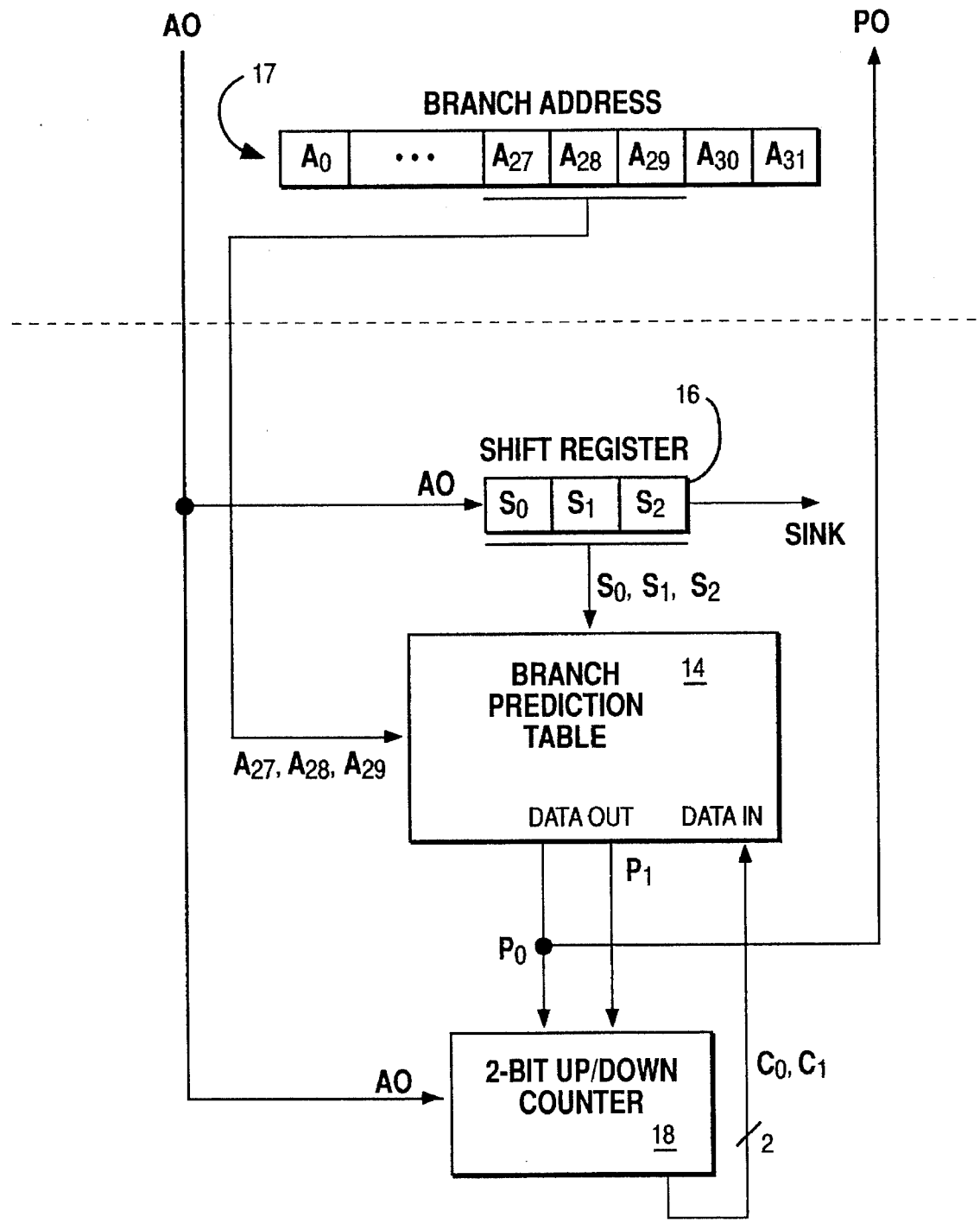
FIG. 3 is a schematic block diagram of the invention as applied to a branch processor of a computer.

A preferred implementation of the invention is depicted in FIG. 3. The implementation is suitable for inclusion in the RISC computer of the type noted earlier. The functional elements depicted in FIG. 3 are preferably integrated into branch processor 13, as appears in FIG. 2.

The invention as embodied in the architecture is distinctly characterized in a number of respects. First, there exists branch prediction table 14, preferably in the form of a static RAM. The table for the present embodiment is configured with eight entries (rows) individually composed of eight 2-bit fields, as more definitively depicted in FIG. 4.

Next, and unique to the invention, is shift register 16, the contents of which represents whether or not branches were taken in the execution of the preceding three branch instructions. Note that the outcomes of both conditional and unconditional branches are entered into shift register 16.

Thirdly, the address for the table is derived from a combination including the 3 bits provided by shift register 16, namely bits $S_0$, $S_1$ and $S_2$, and 3 bits selected from the branch instruction, namely $A_{27}$, $A_{28}$ and $A_{29}$. The latter 3 bits can be taken directly from the branch instruction address undergoing predictive evaluation, as generally depicted by the bit string at 17, or can be derived from a modulo operation or a hashing algorithm. The field bits are identified as $P_0$ and $P_1$ upon readout from table 14 and as $C_0$ and $C_1$ during update or re-entry into table 14.

The last of the functional elements depicted in FIG. 3 is 2-bit up/down counter 18, a counter used to individually increment or decrement the 2-bit value associated with each field in table 14. The value is changed based upon the outcome of the branch under consideration.

Figure 4:
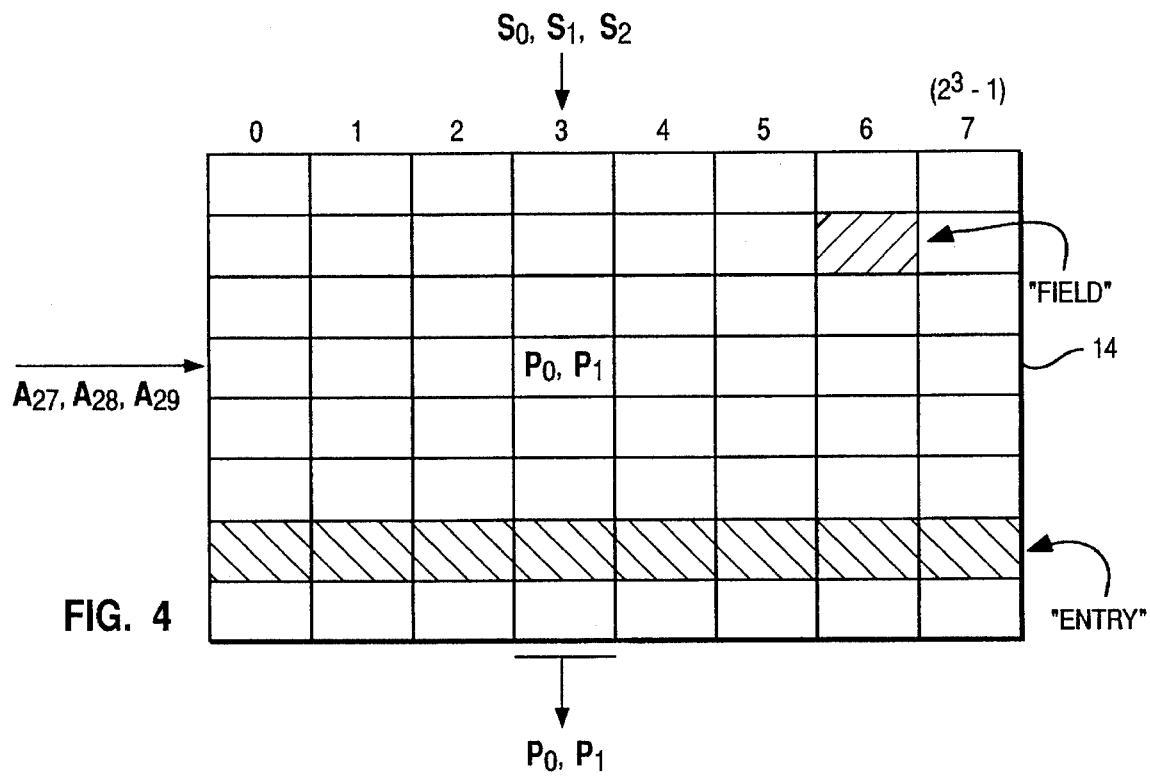
FIG. 4 is a schematic diagram of a branch prediction table readout.
Figure 5:
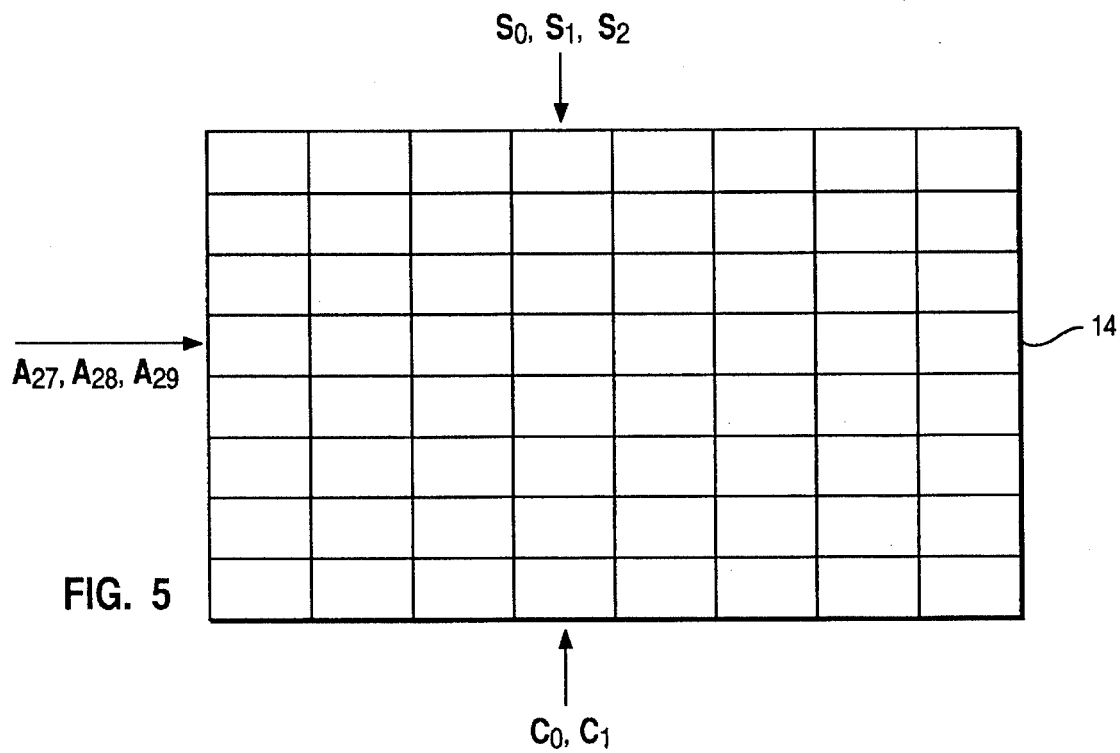
FIG. 5 is a schematic diagram of the branch prediction table update.

FIG. 4 schematically illustrates accessing of a field in branch prediction table 14 using the composite address defined by the shift register and select branch address bits to provide as an output the stored data bits $P_0$ and $P_1$. Updating of the prediction data in table 14 is schematically depicted in FIG. 5, where the updated counter data $C_0$ and $C_1$ is entered into branch prediction table 14 at the correspondingly defined field.

It should be recognized that the size of table 14 is dictated in one respect by the size of shift register. If the shift register is selected to relate the outcomes of M successive branch instructions, each entry will have $2^M$ fields. Generally, the table can have $2^Q$ entries (rows). Both M and Q are design parameters. Proper values for M and Q are determined by the size of memory available for the table, the size of the counter, and the typical workload running on the system. The number of bits in each field is defined by the size of the prediction counter, where an N-bit field will accommodate a counter accumulating a value up to $2^N-1$.

Figure 6:
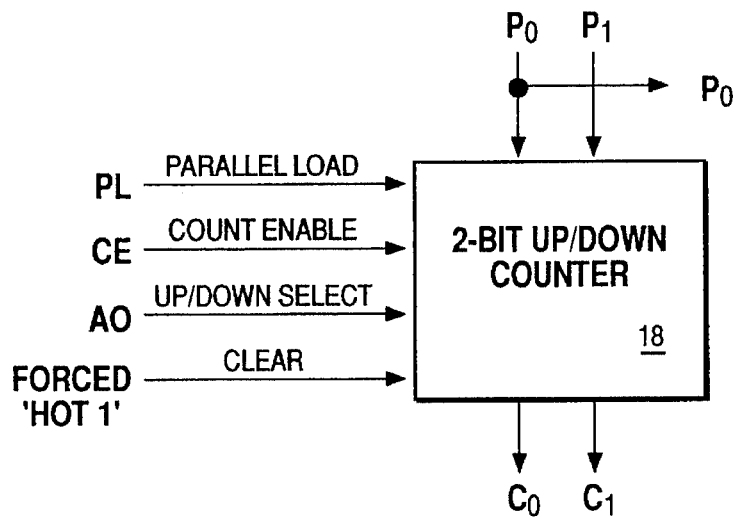
FIG. 6 is a schematic diagram of a counter.
Figure 7:
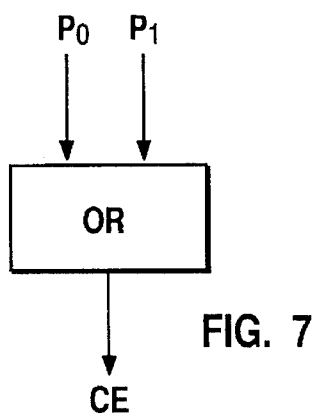
FIGS. 7 & 8 are block diagrams of logic functions used in conjunction with the invention
Figure 8:
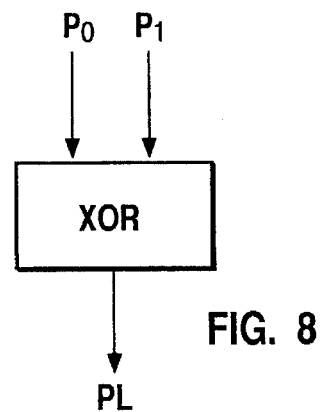

The 2-bit up/down counter identified by reference numeral 18 in FIG. 2 is shown in greater detail in FIG. 6. Note that input line A0, corresponding to the previous branch outcome, defines whether the counter is to be incremented or decremented. The signals which drive control lines CE and PL of counter 18 are generated in logic OR and XOR blocks as respectively shown in FIGS. 7 and 8 based upon the bit content of table outputs $P_0$ and $P_1$. The logic of the XOR gate in FIG. 8 is to override the counter function upon its reaching its minimum value of 0 (binary 00) or its maximum value of 3 (binary 11) and transfer the inputs $P_0,P_1$ in parallel to the outputs $C_0,C_1$ immediately following the 0–1 transition of the clock, while the logic in FIG. 7 is to enable the counter function to increment or decrement the inputs $P_0,P_1$ based on the up/down select signal A0. The control signal clear in FIG. 6 is forces a "1" to prevent the counter being reset to value "0".

Figure 9:
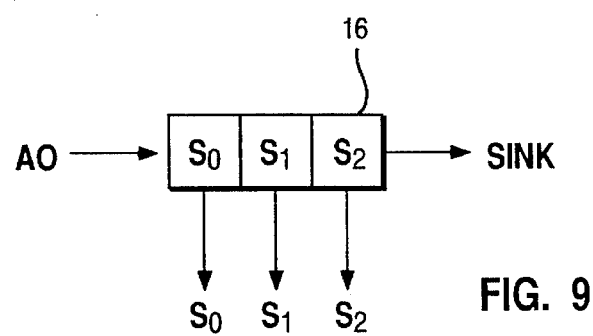
FIG. 9 is schematic diagram of a shift register.

Shift Register 16 in FIG. 3 is shown in greater detail in FIG. 9. As embodied in the present invention, actual branch (conditional or unconditional branch) outcomes are provided at input A0 and are successfully shifted to the right into the next adjacent positions immediately following the next clock cycle. The outcome data is shifted to the right every time a new branch outcome appears at the input A0, until discarded upon being shift from the right most position $S_2$. The binary value in each position represents the states of $S_0,S_1$ and $S_2$.

Operationally the branch prediction architecture depicted in FIG. 3 correlates a multiplicity of branches by relating branch address information to defined outcomes of prior branching operations, so that the prediction data extracted from the table takes into account information derived from patterns of branching operations weighted in relation to their historical occurrence.

The data stored in each field of table 14 can have a value represented by 00, 01, 10 or 11 bit combinations. The table value selected by the combination of the branch address and the shift register bits is incremented or decremented by a binary value of 1 using 2-bit up/down counter 18 based upon the outcome of the branch under consideration as represented by a "0" or "1" on line A0. For example, if a branch is not taken the value in counter 18 is decreased by 1, with a minimum value of 0, while if the branch is taken the counter value is increased by 1, with a maximum value of 3. The new count, represented by bits $C_0$ and $C_1$, is then written to the corresponding field in table Developers of computers which expect to run programs exhibiting numerous control transfers will recognize the importance of improved branch prediction, given the trend toward more and larger pipelines. Similarly, successful branch prediction is of acute importance to superscalar computers which implement out of order instruction execution. In general, the longer and more elaborate the concurrency of processing the more important branch prediction becomes.

Preliminary experience has shown that correlation based branch prediction as embodied herein exhibits a diminishing return of accuracy as the size of the table is increased. In general, the benefits of correlation based branch prediction are affected by the intensity of the address conflicts, which depend in general on the number of unique branches, the run-time distribution of the unique branches, the number of conflicting branch addresses, and the size of the table.

An instruction level simulation using the architecture depicted in FIG. 3 has confirmed that the quality of prediction, measured both in terms of overall accuracy and in terms of the relative reduction in misprediction, is quite significant. Interestingly, the results were derived using a relatively small 3-bit shift register and a 2-bit per field prediction table, of the form actually depicted in FIG. 3.

Though the invention has been described and illustrated by way of a specific embodiment, the apparatus and methods encompassed by the invention should be interpreted consistent with the breadth of the claims set forth hereinafter.

We claim:

1. A method for predicting an outcome of a branch instruction in a programmed computer, comprising the steps of:

creating a branch prediction table in addressable memory of the computer;

storing in the branch prediction table branch data which correlates branch instructions to a data sequence representing a succession of multiple prior branch outcomes; and selecting branch data from the table using an address created from a combination of a first branch instruction and a first data sequence of prior branch outcomes.

2. The method recited in claim 1, including the further step of:

periodically updating the branch prediction table by increment or decrementing branch data based upon the taking or not taking of a branch specified in a branch instruction.

3. In a programmable workstation having an addressable memory and multiple processors, a branch processor comprising:

means for storing branch prediction data in the memory;

means for updating the branch prediction data in the memory;

means for storing a data sequence representing a succession of multiple prior branch outcomes; and means for selecting branch prediction data stored in memory using an address created from a combination of a new branch instruction and the data sequence representing a succession of prior branch outcomes.

4. The apparatus recited in claim 3, wherein the means for storing data is a multiple field matrix memory.

5. The apparatus recited in claim 4, wherein the means for updating is an up/down counter which communicates with individual matrix memory fields.

6. The apparatus recited in claim 5, wherein the means for storing a data sequence representing a succession of prior branch outcomes is a shift register.

7. In the apparatus recited in claim 6, wherein the shift register stores a data sequence representing the taking or not taking of prior branches.

8. The apparatus recited in claim 7, wherein the new branch instruction and the data sequence representing a succession of prior branch outcomes uniquely select a field in the multiple field matrix memory.

\* \* \* \* \*